United States Patent [19]

Geke et al.

[11] Patent Number: 4,933,091

[45] Date of Patent: Jun. 12, 1990

[54] PROCESS FOR COAGULATING LACQUERS AND THE LIKE

[75] Inventors: Juergen Geke, Duesseldorf; Ragnar Margeit, Duisburg, both of Fed. Rep. of Germany

[73] Assignee: Henkel Kommanditgesellschaft auf Aktien, Duesseldorf, Fed. Rep. of Germany

[21] Appl. No.: 325,626

[22] Filed: Mar. 20, 1989

[30] Foreign Application Priority Data

Mar. 25, 1988 [DE] Fed. Rep. of Germany ....... 3810166

[51] Int. Cl.$^5$ ................................................ C02F 1/56
[52] U.S. Cl. ...................................... 210/712; 55/85; 210/725; 210/728; 210/733
[58] Field of Search ................... 55/84, 85; 134/38; 210/712, 725, 727, 728, 729, 733; 427/331

[56] References Cited

U.S. PATENT DOCUMENTS

| | | | |
|---|---|---|---|
| 3,515,575 | 6/1970 | Arnold | 55/84 |
| 3,723,148 | 3/1973 | Tupper et al. | 106/287 |
| 3,861,887 | 1/1975 | Forney | 55/85 |
| 3,990,986 | 11/1976 | Gabel et al. | 252/315 |
| 4,629,477 | 12/1986 | Geke | 55/85 |
| 4,693,909 | 9/1987 | Ziegler et al. | 427/156 |
| 4,699,730 | 10/1987 | Miles et al. | 252/181 |
| 4,764,561 | 8/1988 | Kiss et al. | 210/728 |

FOREIGN PATENT DOCUMENTS

| | | |
|---|---|---|
| 163108 | 4/1985 | European Pat. Off. . |
| 280440 | 8/1988 | European Pat. Off. . |
| 1017957 | 10/1957 | Fed. Rep. of Germany . |
| 2347068 | 3/1975 | Fed. Rep. of Germany . |
| 3512564 | 10/1986 | Fed. Rep. of Germany . |
| 50-13277 | 2/1975 | Japan ....................... 210/733 |
| 1068660 | 4/1966 | United Kingdom . |
| 1512222 | 5/1975 | United Kingdom . |

OTHER PUBLICATIONS

Chem. Abst. 104:131538v Hydrophobic Polymer Ampholyte for Laquer Coagulation, Ger. Offen DE 3,416,119.

*Primary Examiner*—Peter Hruskoci
*Attorney, Agent, or Firm*—Ernest G. Szoke; Wayne C. Jaeschke; Norvell E. Wisdom, Jr.

[57] ABSTRACT

Removal of wet overspray from lacquer or similar water insoluble coatings by predominantly aqueous cleaning liquids is improved by including in the cleaning liquids as a coagulation agent a salt of a copolymer of ethylene and acrylic acid that contains 8 to 25% by weight of acrylic acid units and 92 to 75% by weight of ethylene units in its acid form. The cleaning liquid may be conveniently made by diluting an aqueous concentrate containing 2 to 25% by weight of the copolymer salt. Including cyanamide derivatives such as calcium cyanamide in the cleaning liquid further improves its coagulating effectiveness.

20 Claims, No Drawings

PROCESS FOR COAGULATING LACQUERS AND THE LIKE

FIELD OF THE INVENTION

This invention relates to a process for the coagulation of lacquers and other organic coating compositions with the aid of a particular coagulating composition. The composition may be used effectively by adding it to the circulating water in the wet separators of spray coating plants.

STATEMENT OF RELATED ART

When lacquers, waxes, or similar coating compositions containing water-insoluble organic substances are used, e.g. in the automotive industry, it is not possible to apply the compositions exclusively to the parts which are to be coated. Particularly during the lacquering of motor vehicles, so-called "overspray" accumulates in the lacquer spray booths. This overspray is removed from the lacquer spray booths by means of water and is washed into what is known as a settling basin. Chemicals must be added to the wash water to coagulate the lacquer or other coating composition, in order not to impede the functioning of the water conveying pipes, jet system, and sprinkling system by adherent particles, and also to help separate recirculated water from the content of coating coagulum that it has taken up. In the remainder of the description below, "lacquer" will be frequently used as generic term for any similarly water-insoluble coating composition.

The detackification of the coating particles which have been sprayed and taken up by the water and their agglomeration to form a removable coagulum should preferably take place in one operation.

Depending on the available equipment, either a coagulant that causes the lacquer coagulum to float in the settling basin, so that it can be skimmed off from the surface of the water, or a coagulant that causes the coagulum to settle, so that it can then be removed from the bottom of the basin by a scraper, is normally used.

A range of neutral and alkaline products are known in the art and commercially available for the coagulation of the usual lacquers employed, primarily in the automotive industry. In the past, alkaline powder or liquid products and neutral powdered products have been added to circulating water to cause coagulation, i.e. detackification of the lacquer particles and their agglomeration into a removable coagulum.

In GB-PS 1 512 022, for example, flocculating agents are described, i.e. agents which cause the agglomeration of particles by the action of macromolecules that form intermolecular bridges. These flocculating agents are combinations of inorganic metal salts, such as ferrous chloride or aluminum sulfate, which act as clarifying agents, and organic cationic polymers, such as polyvinyl pyridine or polyamines, in aqueous solution.

Substances added to rinse water to coagulate lacquers and primers are disclosed in DE-OS 15 17 409. They contain water-soluble alkali metal salts and/or alkaline earth metal salts, sparingly water-soluble hydroxides of polyvalent metals, such as magnesium, iron, aluminum, or chromium, and aliphatic or cycloaliphatic amines.

Lacquer detackification agents and sedimentation agents which contain aliphatic carboxylic acids with 12 or more carbon atoms or their alkali, ammonium, or alkanolamine salts, along with antifoam agents, are described in DE-AS 23 47 068.

Aqueous solutions for the removal of overspray, which contain alkalis and organic amines or alkanolamines with organyl groups with 2 to 10 carbon atoms, are described in DE-OS 20 06 008.

Mixtures of alkanolamines with metallic salts and polyether polyamines in aqueous solution for the detackification of lacquer spray particles and for the clarification of the circulating water in lacquer spray booths are also disclosed in U.S. Pat. No. 3,990,986 of Nov. 9, 1976 to Gabel et al.

From DE-OS 34 12 763 and U.S. Pat. No. 4,629,477 of Dec. 16, 1986 to Geke, coagulants for lacquers and organic coating compositions, in particular for two-component polyurethane lacquers, are known. These contain a mixture of cyanamide, dicyandiamide, and/or calcium cyanamide in combination with polyethylene imines and other coagulation aids.

The known neutral and alkaline coagulants have disadvantages when employed for the coagulation of the usual lacquers. They require a relatively long time to coagulate the small particles of lacquer and to separate completely the circulating water used from the excess lacquer mist. In unfavorable cases this leads to the sedimentation of adhering lacquer particles in the pipeline systems near the point of exit of the circulating water from the lacquering booth. In addition, the majority of known coagulants contain substances, e.g. inorganic anions (chloride, sulfate), which accumulate in the circulating water and can have a corrosive effect on various parts of the plant. The maximum possible extension of the useful life of the disposal baths is desirable, to minimize the expense for depolluting treatment required before the contents of used baths can be discharged into the environment. Therefore, it is undesirable to use substances which accumulate rapidly and impair the ability of the plant to function for various reasons, because this accumulation necessitates frequent bath changes.

The present invention attempts to rectify these disadvantages, its major object being to achieve the problem-free coagulation of lacquers and other organic coating compositions.

DESCRIPTION OF THE INVENTION

The process of the invention utilizes an aqueous concentrate containing a salt of an ethylene-acrylic acid copolymer.

Except in the operating examples or where otherwise explicitly indicated, all numbers in the description below that specify amounts of materials or conditions of reaction or use are to be understood as modified by the word "about".

Ethylene-acrylic acid copolymers such as are used in the invention are known per se. For example in EP 0 201 702 A2 there is taught a liquid preservative for metal and lacquer surfaces, which is based on an aqueous dispersion of an ethylene-acrylic acid copolymer, comprising 8 to 25% by weight of acrylic acid units and 92 to 75% by weight of ethylene units, referred to the acid form of the copolymer. In this case the carboxyl groups of the ethylene acrylic acid copolymer are neutralized to 50 to 100 mole %. Aqueous dispersions such as this are used for the temporary preservation of metallic and lacquer surfaces.

The present invention, in contrast, is concerned in one major embodiment with the use of an aqueous concentrate of fully neutralized ethylene-acrylic acid copolymers for the coagulation of lacquers and other organic coating compositions. This aqueous concentrate contains 2 to 25% by weight of a salt of an ethylene acrylic acid copolymer, which in turn has 8 to 25 % by weight of acrylic acid units and 92 to 75% by weight of ethylene units, referred to the acid form of the copolymer. The salt used may be with an inorganic or organic base.

In contrast to the powders or liquid dispersions and suspensions known from the prior art, the aqueous concentrates used according to this invention are clear liquids, without addition of any organic solvent. Moreover, the aqueous concentrates used according to the invention are also suitable for the coagulation of lacquers which normally cause problems with previously known coagulants. Furthermore, the coagula of excess lacquer obtained with the help of the aqueous concentrates according to the invention are readily floated and have a very favorable consistency for separation from the circulating water.

As already noted above, the ethylene-acrylic acid copolymers used in the present invention contain 8 to 25% by weight of acrylic acid units and 92 to 75% by weight of ethylene units, referred to the acid form of the copolymer. Copolymers that contain 12 to 22% by weight of acrylic acid units and 88 to 78% by weight of ethylene units, referred to the acid form of the copolymer, are preferably used. In the aqueous concentrates used according to the invention, these copolymers are present as a salt of an inorganic or organic base, and preferably as alkali metal, ammonium, amine, or alkanolamine salts. Examples of suitable bases to yield these salts are sodium hydroxide and potassium hydroxide, ammonia and/or amines, e.g. isophosphoronediamine, or alkanol amines, such as monoethanolamine, diethanolamine, triethanolamine, isopropanolamine, or dimethylethanolamine.

The aqueous concentrates used according to the invention contain 2 to 25% by weight, and preferably 5 to 20% by weight, of these ethylene-acrylic acid copolymers. The production of these copolymers is described, for example, in EP 0 201 702 A2 which has already been cited above. This production is by continuous high-pressure polymerization of ethylene with acrylic acid in the presence of radical-generating initiators. Appropriate ethylene acrylic acid copolymers are commercially available; they can be obtained, for example, from BASF, Ludwigshafen, West Germany, under the trade mark Poligen ®.

The aqueous concentrates used according to the invention preferably contain in addition 0.5 to 4% by weight of cyanamide and/or dicyandiamide and/or cyanamide salts, referred to the total composition of the concentrate. More preferably, the content of these cyanamide derivatives in the aqueous concentrates amounts to 2 to 3% by weight. Calcium cyanamide is used most preferably as the cyanamide salt in the present invention. The use of these cyanamide derivatives in lacquer coagulants is known per se from DE-OS 34 12 763. In the present invention, the lacquer coagulating effect of the ethylene-acrylic acid copolymers used, which is very good by itself, is improved further by the additional use of these cyanamide derivatives.

The aqueous concentrates used according to the invention can in addition contain 0.5 to 20% by weight, referred to the total composition of the concentrate, of other coagulants and/or coagulation aids which have been previously known.

Additional coagulants suitable for the present invention are water-soluble inorganic salts, preferably sodium hydrogen carbonate and/or magnesium nitrate, alkali metal hydroxides, such as sodium or potassium hydroxide, and amines and/or alkanolamines, e.g. monoethanolamine, triethanolamine, or isopropanolamine.

Types of coagulation aids suitable for the present invention are biocides and/or substances that adjust the pH value and/or corrosion inhibitors and/or anti-foaming agents and/or solubilization agents. Examples of suitable biocides are formaldehyde, isothiazolines, and their derivatives and also pyridine-N-oxide and its derivatives. Suitable adjusters for pH value are non-corrosive inorganic or organic acids, such as phosphoric acid or benzoic acid and their acid salts, and also the alkali metal hydroxides named above and/or amine components such as mono- or triethanolamine. Suitable corrosion inhibitors may be selected, for example, from the alkanolamines and water-soluble phosphonate salts, e.g. 1-hydroxyethane-1,1-diphosphonic acid sodium salt. As an anti-foaming agent, in addition to the agents known from the prior art for this purpose, the product Dehydran ®F of Henkel KGaA, Dusseldorf, West Germany, has proved particularly useful. This product is based on a combination of metal soaps in mineral oil. Suitable solubilization agents are known sufficiently from the prior art; an example is sodium cumenesulfonate.

The concentrates used as in the invention are produced by mixing the individual components described above with water. It is preferred that the pH value of the aqueous concentrates be adjusted so that after the concentrate is diluted with water to a concentration of 1%, the pH value is in the range of 7.5 to 10, and more preferably in the range of 8 to 9.

Normally, the concentrates are mixed with additional water in the course of their practical use in coagulating coating compositions, for cleaning or other purposes. Preferably, after the maximum degree of dilution reached during use, the aqueous liquid composition used for actual coagulating contains from 10 to 100 ml of concentrate per cubic meter of liquid.

The aqueous concentrates used according to the invention are suitable for the coagulation of all the usual types of lacquer and other organic coating compositions such as waxes and underseal. In all cases tried, a very rapid coagulation effect occurs, i.e. the lacquer particles entrained in the circulating water are very rapidly detackified, so that they do not adhere to the equipment in the plant. Most of the coagulum particles that are formed float and are briskly carried forward by the flow of the circulating water without blocking the pipes.

The present invention accordingly also may be embodied in a process for the coagulation of lacquers and other organic coating compositions in which an aqueous concentrate as described above is added to the circulating water in the wet separators of spray lacquering plants. The aqueous concentrates can be added either directly or after being diluted with water to a desired concentration. They are preferably added at a point where there is vigorous turbulence of the circulating water, while a pump is operating to ensure rapid distribution.

The metering of the aqueous concentrates used according to the invention can take place either continuously by means of a suitable dispensing device or discontinuously. Preferably for the process according to the invention, the aqueous concentrate is added to the circulating water in amounts of 10 to 100 ml per cubic meter per hour of operation, and more preferably in amounts of 30 to 50 ml per cubic meter per hour of operation.

The invention is explained in more detail, but not limited, by the following operating examples. In these examples formulations of aqueous concentrates for the use according to the invention are given first.

EXAMPLE 1

The concentrate contained 50% by weight of a 26% by weight aqueous emulsion of the dimethylethanolamine salt of an ethylene-acrylic acid copolymer (Poligen® WE4, from BASF, Ludwigshafen), with the balance water.

EXAMPLE 2

This concentrate contained 45% by weight of the same copolymer salt emulsion as in Example 1, 2% by weight of dicyandiamide, with the balance water.

EXAMPLE 3

This concentrate contained 30% by weight of the same copolymer salt emulsion as in Example 2, 3% by weight of dicyandiamide, 8% by weight of triethanolamine, 3% by weight of 1-hydroxyethane-1,1-diphosphonic acid, and the balance water.

EXAMPLE 4

This concentrate contained 40% by weight of a 26% by weight aqueous emulsion of the sodium salt of an ethyleneacrylic acid copolymer (Poligen® WE2, also from BASF, Ludwigshafen), 2% by weight of dicyandiamide, 5% by weight of benzoic acid, 10% by weight of isopropanolamine, and the balance water.

FIRST TEST METHOD FOR EXAMPLES 1-4

The coagulation effectiveness of the formulations in the above Examples 1 to 4 was tested on the following lacquers:
(A) One-component high-solids top-coat lacquer of Herberts Co. ("Einbrenn- und Decklack Mellanrod 173-2");
(B) One component polyurethane intermediate coating, protective against impacts from gravel, from Bollig & Kemper ("Heliotherm ™ Steinschlag-Zwischengrund, grau, 05-166-7663")

The tests were carried out in a pilot scale lacquer spray booth, which had a water content of 1 m³. With the pump in operation, an amount of 1 g/liter of each of the aqueous concentrates was added to the circulating water. Then, with a lacquer spray gun, an amount of 0.05% by weight, referred to the circulating water, of the above-named spray lacquers was sprayed evenly on the water. A coagulation effect could be observed after a few minutes: the lacquer coagulated in a finely dispersed, non-adherent form. Most of the coagulum of lacquer which formed floated and was easily separated from the circulating water.

COMPARATIVE EXAMPLE 1

The coagulation effectiveness of the formulation in Example 2 was compared with that of a commercially available coagulant (P3 ®-croni, Henkel, Dusseldorf) based on inorganic salts (sodium carbonate, phosphates). The criteria in the following evaluation scale were used for the evaluation of the results:

Evaluation scale for lacquer coagulation

Degree of detackification of the lacquer:
K1 = non-tacky throughout
K2 = removable (surface non-tacky, inside still tacky)
K3 = not detackified
Appearance of the lacquer coagulum:
A1 = fine dispersed particles
A2 = average sized dispersed particles
A3 = coarse dispersed particles
A4 = clumps, at least partially settled or floating The tests were carried out in the same way as described above for Examples 1-4 and gave the following results:

| Lacquer Type* | Coagulant Used | Detackification Rating | Appearance Rating |
|---|---|---|---|
| A | As in Example 2 | K1 | A2 |
|   | P3 ®-croni | K2-K3 | A4 |
| B | As in Example 2 | K1 | A2 |
|   | P3 ®-croni | K2-K3 | A2 |

*For details about lacquer, see above under "First Test Method . . ."

What is claimed is:
1. In a process for coagulating, by contact with a predominantly aqueous liquid, a substantially water insoluble organic coating composition including lacquer entrained in circulating water and separating the resulting coagulum from the circulating water, the improvement wherein said predominantly aqueous liquid is prepared by diluting with water an aqueous concentrate comprising between about 2 and about 25% by weight of a salt of a copolymer of ethylene and acrylic acid, said copolymer having about 8 to about 25% by weight of acrylic acid units and about 92 to about 75% by weight of ethylene units in its acid form.

2. A process according to claim 1, wherein the aqueous concentrate contains about 5 to about 20% by weight of the copolymer.

3. A process according to claim 2, wherein the copolymer salt is an alkali metal, ammonium, amine, or alkanolamine salt.

4. A process according to claim 3, wherein the aqueous concentrate additionally comprises from about 0.5 to about 4% by weight, referred to the total composition of the concentrate, of material selected from the group consisting of cyanamide, dicyandiamide, and cyanamide salts.

5. A process according to claim 4, wherein the aqueous concentrate additionally comprises from about 0.5 to about 20% by weight, referred to the total composition of the concentrate, of material selected from the group consisting of other water-soluble inorganic salts, alkali metal hydroxides, amines, alkanol amines, biocides, pH value adjusters, corrosion inhibitors, antifoaming agents, and solubilization agents.

6. A process according to claim 9, wherein the aqueous concentrate has a composition such that after dilution of the concentrate with water to a concentration for 1%, the pH value is between about 7.5 and about 10.

7. A process according to claim 4, wherein the aqueous concentrate has a composition such that after dilution of the concentrate with water to a concentration of 1%, the pH value is between about 7.5 and about 10.

8. A process according to claim 2, wherein the aqueous concentrate additionally comprises from about 0.5 to about 4% by weight, referred to the total composition of the concentrate, of material selected from the group consisting of cyanamide, dicyandiamide, and cyanamide salts.

9. A process according to claim 8, wherein the aqueous concentrate additionally comprises from about 0.5 to about 20% by weight, referred to the total composition of the concentrate, of material selected from the group consisting of other water-soluble inorganic salts, alkali metal hydroxides, amines, alkanol amines, biocices, pH value adjusters, corrosion inhibitors, antifoaming agents, and solubiliziation agents.

10. A process according to claim 1, wherein the aqueous concentrate additionally comprises from about 0.5 to about 4% by weight, referred to the total composition of the concentrate, of material selected from the group consisting of cyanamide, dicyandiamide, and dyanamide salts.

11. A process according to claim 6, wherein the aqueous concentrate additionally comprises from about 0.5 to about 20% by weight, referred to the total composition of the concentrate, of material selected from the group consisting of other water-soluble inorganic salts, alkali metal hydroxides, amines, alkanol amines, biocides, pH value adjusters, corrosion inhibitors, antifoaming agents, and solubilization agents.

12. A process according to claim 11, wherein the aqueous concentrate has a composition such that after dilution of the concentrate with water to a concentration of 1%, the pH value is between about 7.5 and about 10.

13. A process according to claim 1, wherein the aqueous concentrate has a composition such that after dilution of the concentrate with water to a concentration of 1%, the pH value is between about 7.5 and about 10.

14. In a process for coagulating, by contact with a predominantly aqueous liquid, a substantially water insoluble organic coting composition including lacquer entrained in circulating water and separating the resulting coagulum from the circulating water, the improvement wherein said predominantly aqueous liquid comprises in each cubic meter the amount and type of copolymer salt that is in from about 10 to about 100 ml of an aqueous concentrate comprising between about 2 and about 25% by weight of a salt of a copolymer of ethylene and acrylic acid, said copolymer having about 8 to about 25% by weight of acrylic acid units and about 92 to about 75% by weight of ethylene units in its acid form.

15. A process according to claim 14, wherein said liquid comprises in each cubic meter the amount and type of copolymer salt that is in from about 30 to about 50 ml of an aqueous concentrate comprising between about 5 and about 20% by weight of a salt of a copolymer of ethylene and acrylic acid, said copolymer having about 8 to about 25% by weight of acrylic acid units and about 92 to about 75% by weight of ethylene units in its acid form.

16. A process according to claim 15, wherein said aqueous concentrate additionally comprises from about 0.5 to about 4 % by weight, referred to the total composition of the concentrate, of material selected from the group consisting of cyanamide, dicyandiamide, and cyanamide salts.

17. A process according to claim 16, wherein said liquid additionally comprises materials selected from the group consisting of other water-soluble inorganic salts, alkali metal hydroxides, amines, alkanol amines, biocides, pH value adjusters, corrosion inhibitors, antifoaming agents, and solubilization agents.

18. A process according to claim 17, wherein said liquid is used as the circulating rinse liquid in a spray coating plant including a continuous wet separator.

19. A process according to claim 14, wherein said liquid is used as the circulating rinse liquid in a spray coating plant including a continuous wet separator.

20. A process according to claim 19, wherein the composition of the rinse liquid is maintained substantially constant during use including recycling, by adding to the circulating liquid between about 10 and about 100 ml per cubic meter of circulating liquid per hour of operation of an aqueous concentrate.

* * * * *